(12) United States Patent
Gullotti

(10) Patent No.: US 11,828,571 B2
(45) Date of Patent: *Nov. 28, 2023

(54) WEARABLE DEVICE CAPABLE OF INDUCING ELECTRO-MUSCULAR INCAPACITATION

(71) Applicant: William Gullotti, Jamestown, NY (US)

(72) Inventor: William Gullotti, Jamestown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/384,131

(22) Filed: Jul. 23, 2021

(65) Prior Publication Data

US 2021/0356236 A1 Nov. 18, 2021

Related U.S. Application Data

(63) Continuation-in-part of application No. 16/450,418, filed on Jun. 24, 2019, now Pat. No. 11,073,365.

(51) Int. Cl.
| | | |
|---|---|---|
| *F41H 13/00* | (2006.01) | |
| *A41D 19/00* | (2006.01) | |
| *G01P 15/08* | (2006.01) | |

(52) U.S. Cl.
CPC ..... *F41H 13/0018* (2013.01); *A41D 19/0024* (2013.01); *G01P 15/08* (2013.01)

(58) Field of Classification Search
CPC .. F41H 13/0018; A41D 19/0024; G01P 15/08
USPC .......................................... 361/232
See application file for complete search history.

(56) References Cited

U.S. PATENT DOCUMENTS

| | | | |
|---|---|---|---|
| 11,073,365 B2* | 7/2021 | Gullotti | ................... G01P 15/08 |
| 2003/0137795 A1 | 7/2003 | Buening et al. | |
| 2004/0154071 A1* | 8/2004 | Frahm | ................ A41D 19/0024 2/160 |

(Continued)

FOREIGN PATENT DOCUMENTS

WO 2015149084 A1 10/2015

OTHER PUBLICATIONS

Gullotti, Int'l Publication No. WO2020263836, Int'l Application No. PCT/US2020/039149, International Search Report (2 pages).

(Continued)

*Primary Examiner* — Yemane Mehari
(74) *Attorney, Agent, or Firm* — The Bilicki Law Firm, PC; James A. Cairns

(57) ABSTRACT

A hand-wearable device capable of electro muscular incapacitation device is disclosed. The device may comprise a glove portion including a back side and a palm side, a stun hardware component including a charging port, a rechargeable battery, and a capacitor. First and second terminals may be positioned on the same or different finger(s) of the glove portion, and electrically connected to the stun hardware component. The glove portion may encompass a traditional five-fingered glove, cycling glove, lifting glove, gauntlet, cuff, or bracer. When the hand-wearable device comprises a glove, the glove portion may be an insulated glove. A switch for actuating discharge of an electrical charge from the first and/or second terminal may be activated when contact is made with the switch; an accelerometer may be adapted to prevent the discharge when acceleration of the glove portion has not reached a predetermined rate.

21 Claims, 10 Drawing Sheets

(56) References Cited

U.S. PATENT DOCUMENTS

| | | | |
|---|---|---|---|
| 2013/0294005 A1* | 11/2013 | Garaycochea | F41H 13/0018 |
| | | | 361/232 |
| 2014/0022688 A1 | 1/2014 | Jones et al. | |
| 2015/0040880 A1 | 2/2015 | Tseng | |
| 2015/0233779 A1 | 8/2015 | Chen et al. | |
| 2021/0010786 A1* | 1/2021 | Gullotti | F41H 13/0018 |

OTHER PUBLICATIONS

Gullotti, Int'l Publication No. WO2020263836, Int'l Application No. PCT/US2020/039149, International Preliminary Report on Patentability (8 pages).

Gullotti, European Publication No. 3987242, European Application No. EP20832507, extended European search report (8 pages).

Gullotti, European Publication No. 3987242, European Application No. EP20832507, European search opinion (4 pages).

Gullotti, Australian Application No. 2020301220, Examination report No. 1 (3 pages).

Gullotti, European Publication No. 3987242, European Application No. EP20832507, supplementary European search report (2 pages).

* cited by examiner

WEARABLE DEVICE CAPABLE OF INDUCING ELECTRO-MUSCULAR INCAPACITATION

FIELD OF INVENTION

This invention generally relates to a hand-wearable device capable of inducing electro-muscular incapacitation. The device may be utilized for personal and professional defense purposes such as self-defense, security personnel, tactical, military, law enforcement/police, or other similar purposes.

BRIEF SUMMARY OF THE INVENTION

Disclosed herein is a hand-wearable device capable of electro muscular incapacitation. The device may comprise a glove portion including a back side and a palm side, a stun hardware component including a charging port, a rechargeable battery, and a capacitor. First and second terminals may be positioned on one or more fingers of the glove portion, which may be a common finger or different fingers, and are electrically connected to the stun hardware component.

The glove portion may encompass a traditional five-fingered glove, cycling glove, lifting glove, or gauntlet. In addition, the glove portion may comprise a cuff or bracer. When the hand-wearable device comprises a glove, the glove portion may be an insulated glove.

A switch for actuating the discharge of an electrical charge from the first and/or the second terminal may be activated when contact is made with the switch.

Further, the device may include an accelerometer adapted to prevent the discharge of an electrical charge from the first and second terminal when the acceleration of the glove portion has not reached a predetermined rate.

In another embodiment, the hand-wearable device may further comprise third and fourth terminals on the back side of the glove portion, which are electrically connected to the stun hardware component, as well as and a second switch for actuating the discharge of an electrical charge from the third and fourth terminal when contact is made with the second switch. In this embodiment, the hand-wearable device is adapted to prevent the discharge of an electrical charge from the third and fourth terminals via an accelerometer, which prevents activation of the glove when the acceleration thereof has not reached a predetermined rate.

The hand wearable device disclosed herein may further include a second capacitor that is activated when the when the acceleration sensed by the accelerometer is equal to or above a second predetermined rate. In such cases, a greater amperage may be discharged when the acceleration of the accelerometer is equal to or above a second predetermined rate.

The hand-wearable device also includes an off setting as well as an override setting wherein the accelerometer is deactivated such that the switch may be actuated regardless of the rate of acceleration.

Terminals as well as one or more switches may be located on a knuckle area of the glove portion. In another embodiment, the terminals and one or more pressure sensitive switches are located on fingertip areas of the glove portion. When the hand-wearable device comprises a glove, the glove portion is an insulated glove. In addition, the palm side of the glove portion may include a strip of conductive material for preventing accidental discharge when a user makes a fist.

DETAILED DESCRIPTION

Figure 1:
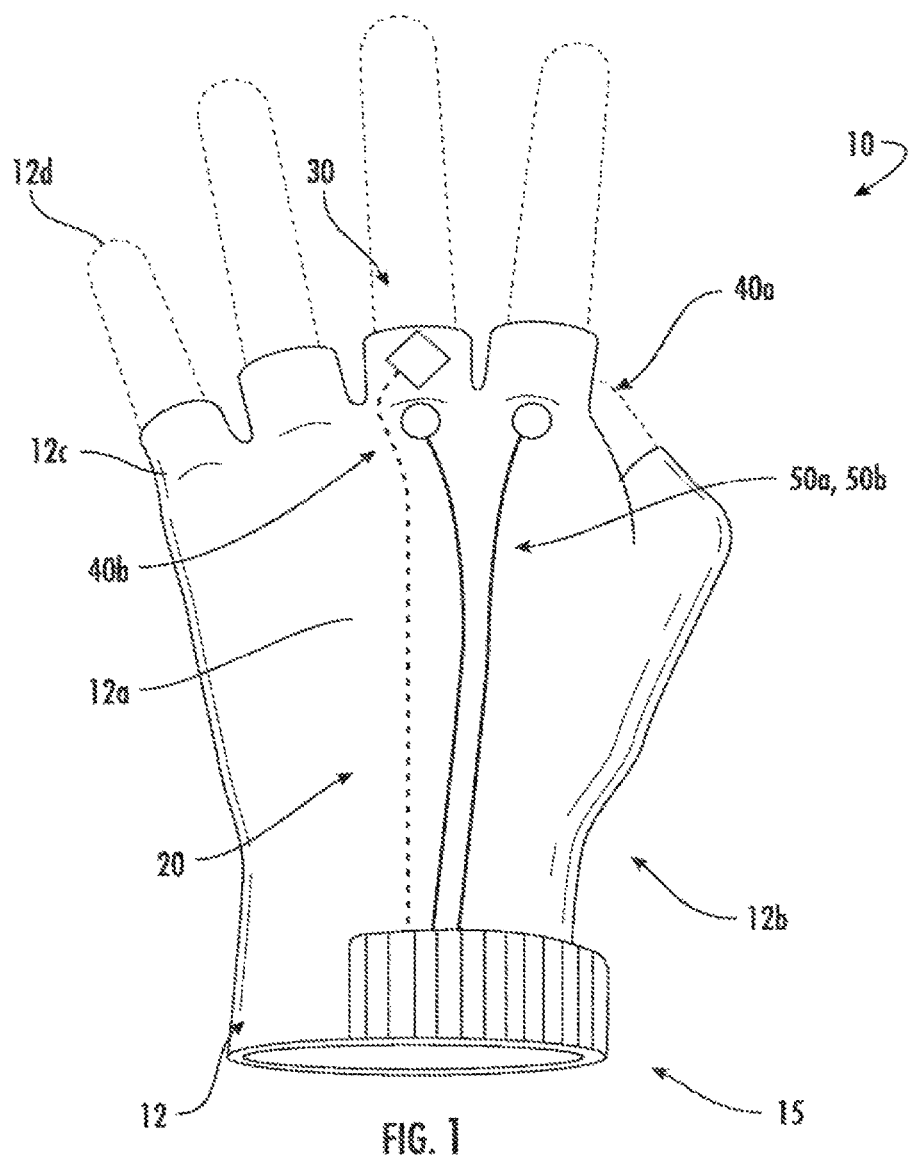
FIG. 1 shows a first embodiment of a hand-wearable device housed within a flexible lifting glove.

A first embodiment shown in FIG. 1 includes a hand-wearable device 10 capable of electro-muscular incapacitation comprising a non-hardened, flexible, insulated fashion, athletic, cycling, or lifting glove 12. This embodiment may be best suited for individual self-defense or private security purposes.

Figure 5:
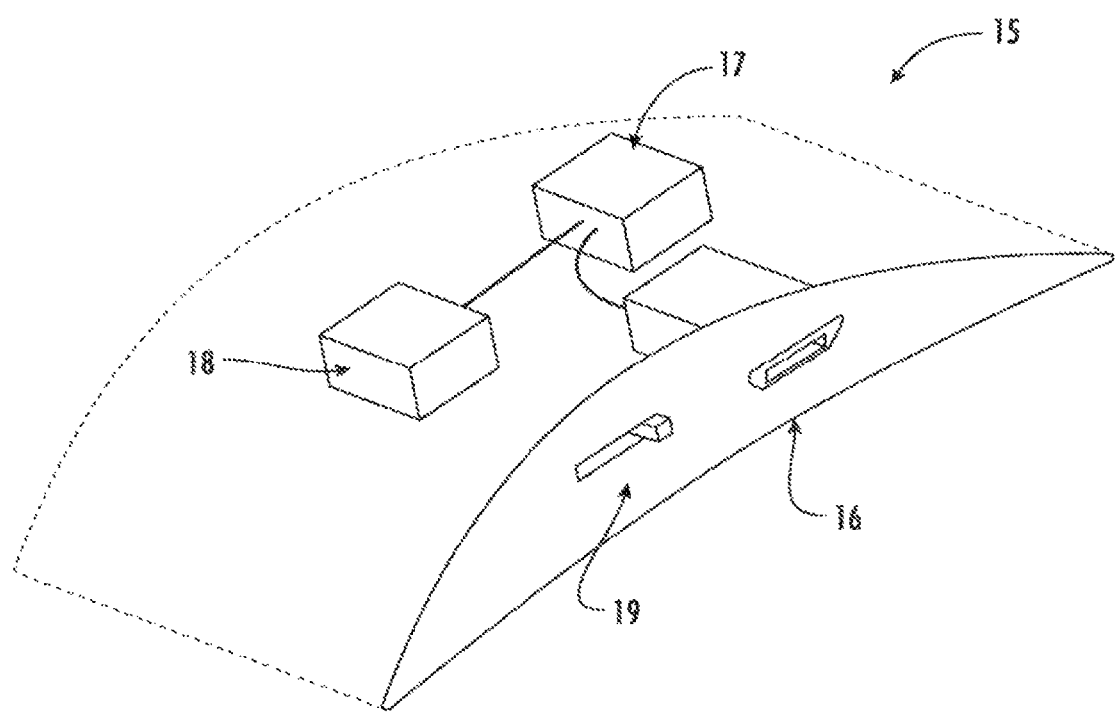
FIG. 5 illustrates elements of a stun hardware component used with a hand-wearable device.

Glove portion 12 comprises a back side 12a and a palm side 12b, a stun hardware component 15 (shown in detail in FIG. 5) including a charging port 16, a rechargeable battery 17, and a capacitor 18. An on/off switch 19 is also provided. First and second contact electrodes or terminals 40a and 40b as well as first and second terminal wires 50a and 50b, may be positioned on back side 12a of glove portion 12 and be electrically connected to stun hardware component 15.

Hand-wearable device 10 comprises a stun device concealed within glove portion 12, which is punch-activated by impact to a switch 30 or compression thereof against a target or attacker. Thus, glove 12 is used and activated in response to an attack or impact with respect to the glove 12. Electrical discharge exits through contact terminals 40a and 40b affixed to the knuckles 12c of glove 12. A trigger or on/off switch 30 is located on the knuckles 12c of glove 12, and is connected to stun hardware component 15 by switch wire 20.

Glove 12 may also comprise an accelerometer (not shown) that activates the glove according to various settings. In particular, the device may include accelerometer adapted to prevent the discharge of an electrical charge from the first and second terminals 40a and 40b when the acceleration of glove portion 12 has not reached a predetermined acceleration rate.

Hand-wearable device 10 also includes an off setting as well as an override setting wherein the accelerometer is deactivated such that switch 30 may be actuated regardless of the rate of acceleration.

Figure 2A:
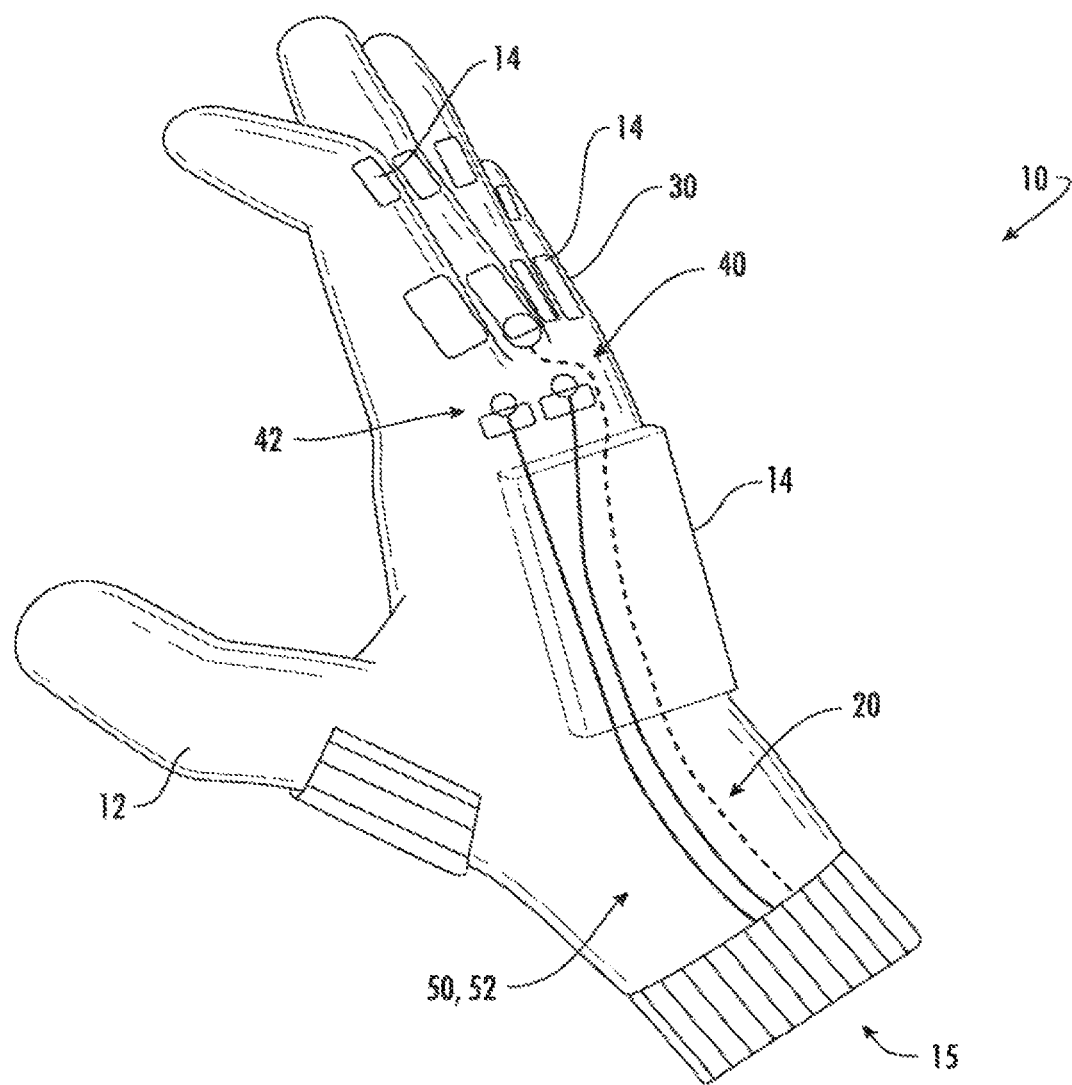
FIGS. 2A & 2B show a second embodiment of a hand-wearable device housed within hardened glove.

A second embodiment of a hand-wearable device 10, capable of electro muscular incapacitation is shown in FIG. 2A, which utilizes a glove 12 having hardened exterior portion 14. Hardened exterior 14 acts as a supplementary weapon. Glove 12 typically comprises an insulated motocross or tactical glove. The second embodiment may thus be best suited for combat, military, or police applications.

Hand-wearable device 10 comprises a stun hardware component 15 concealed within glove portion 12. Similar to the first embodiment, glove portion 12 comprises a back side 12a and a palm side 12b (see FIG. 1), stun hardware component 15 including a charging port 16, a rechargeable battery 17, and a capacitor 18 (shown in detail in FIG. 5), as well as contact terminals 40, 42 and corresponding contact terminal wires 50, 52. As shown for example in FIGS. 1 and 2B, first and second contact terminals 40a and 40b as well as first and second terminal wires 50a and 50b, may be positioned on back side 12a of glove portion 12 and be electrically connected to stun hardware component 15.

Hand-wearable device 10 is punch-activated by impact to one or more on/off switches 30 positioned on glove portion 12. Alternatively, one or more switches 30 may be activated by compression thereof against a target or attacker. Thus, glove 12 is used and activated in response to an attack or impact with respect to the glove 12. Electrical discharge may exit through contact terminals 40a and 40b affixed to the knuckles 12c of glove 12. Switch 30 may be located on the knuckles 12c of glove 12.

Figure 2B:
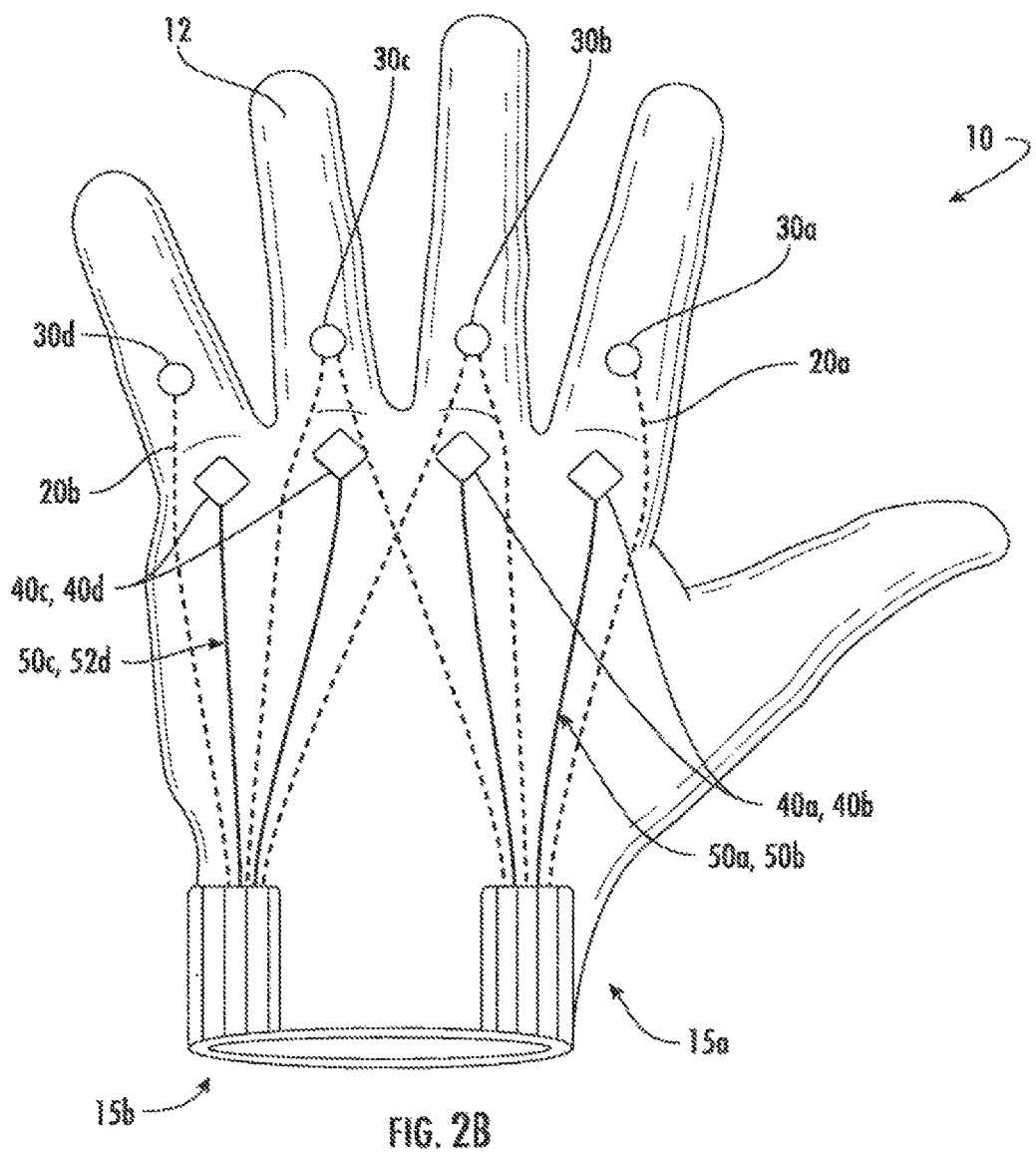

As shown in FIG. 2B, an additional embodiment may include a second stun device with first and second stun hardware components 15a and 15b. In addition, a second set of electrodes or contact terminals 40c, 40d may extend from second stun hardware component 15b to multiple knuckles 12c of glove 12. Third and fourth terminal wires 50c and 50d, may also be positioned on back side 12a of glove portion 12 and be electrically connected to first stun hardware component 15a.

The use of a second stun device creates two separate arcs, which may share switches or alternatively, work independently. As shown in FIG. 2B, multiple switches 30a-30d may be positioned in defined sectors of glove 12, such that impact to a discreet sector of glove 12, will activate one or more of switches 30a-30d, depending on which sector of glove 12 is impacted.

In the case where switches work independently, a switch 30a located on or near the index finger of glove 12, connected to stun hardware component 15a via switch wire 20a, will activate one set of stun hardware 15. (As used herein, "finger", "fingertip", and the like refer to any or all of the digits present in glove 12, including but not limited to the thumb, and encompasses the knuckles at the base of each finger.) Activating switches 30b and 30c located at the middle or ring fingers of glove 12, will activate both sets of stun hardware. In addition, a switch 30d located on or near the pinky of glove 12, connected to stun hardware component 15b via switch wire 20b, will activate one stun hardware set. This configuration ensures the most efficient use of power in the case of a glancing blow but increased maximum stunning potential in the case of a direct hit.

Glove 12 may also comprise an accelerometer (not shown). The accelerometer activates stun hardware 15 according to various settings. In particular, the device may include an accelerometer adapted to prevent the discharge of an electrical charge from any one of terminals 40a-40d when the acceleration of glove portion 12 has not reached a predetermined acceleration rate.

Hand-wearable device 10 also may include an "off" setting, as well as an override setting, wherein the accelerometer is deactivated such that on/off switches 30a-30d may be actuated regardless of the rate of acceleration. When the hand wearable device 10 disclosed herein includes second capacitor 18, capacitor 18 may be activated when the acceleration sensed by the accelerometer is equal to or above a second predetermined rate. In such cases, a greater amperage may be discharged when the acceleration of the accelerometer is equal to or above a second predetermined rate. Alternatively, a greater amperage may be discharged from a main capacitor when the acceleration is equal to or above a predetermined rate.

In operation, switch 19 is first placed in the "on" setting. In the act of throwing a punch, the user's first must first cross the safety threshold of the onboard accelerometer. Upon connecting with a target, the switch/trigger will be compressed by the impact and activate the onboard capacitor/transformer, which is already charged by the rechargeable battery. The discharge will exit the electric terminals located on the knuckles. With the impact of the punch, these terminals will make a contact point with the target as with a traditional stun gun.

In the case where the device registers an acceleration above an upper threshold, a secondary firing mode will engage. This may be achieved by either complete discharge of the capacitor or a secondary discharge simultaneously coming from a secondary capacitor. This mode exists because a presumed strike would be of sufficient speed/force where the user's first would not likely be in contact with the target for a long period of time, making it necessary and safer to dump a larger amperage into the target to deliver a stunning shock.

When switch 19 is set in a "bypass" position, the device activates as follows. In the bypass mode, the safety of the lower accelerometer threshold is overridden. Any instance where there is sufficient force to depress the switch/trigger, it will activate the onboard capacitor/transformer (already charged by the rechargeable battery). The discharge will exit the electric terminals located on the knuckles. In this mode, it gives the user the added ability to use the glove as one would use a traditional stun gun: by maintaining contact with the target and activating it until the desired results are reached. In this case, the secondary firing mode works the same way as the normal "on" mode.

Figure 3A:
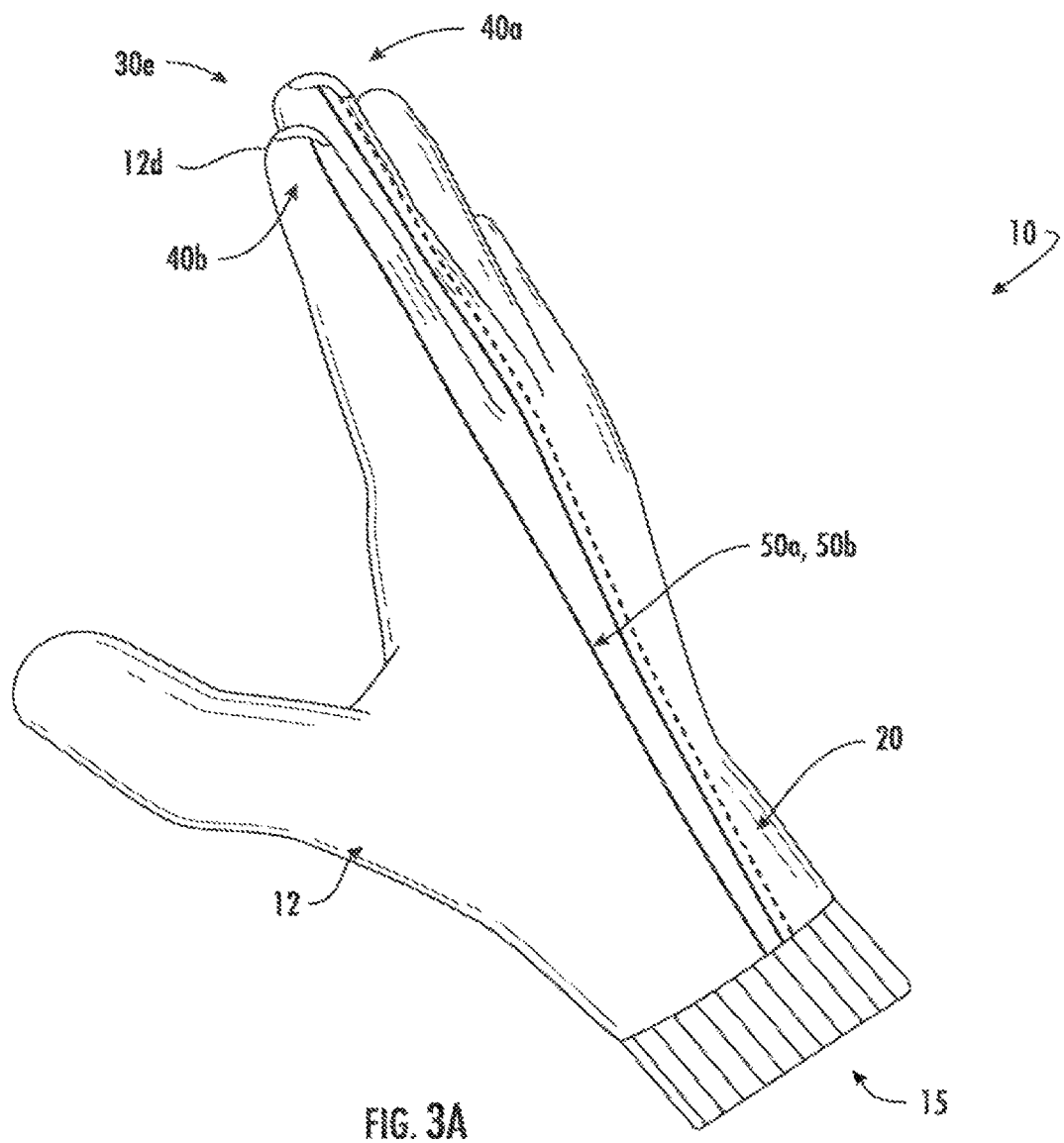
FIGS. 3A & 3B show a third embodiment of a hand-wearable device.
Figure 3B:
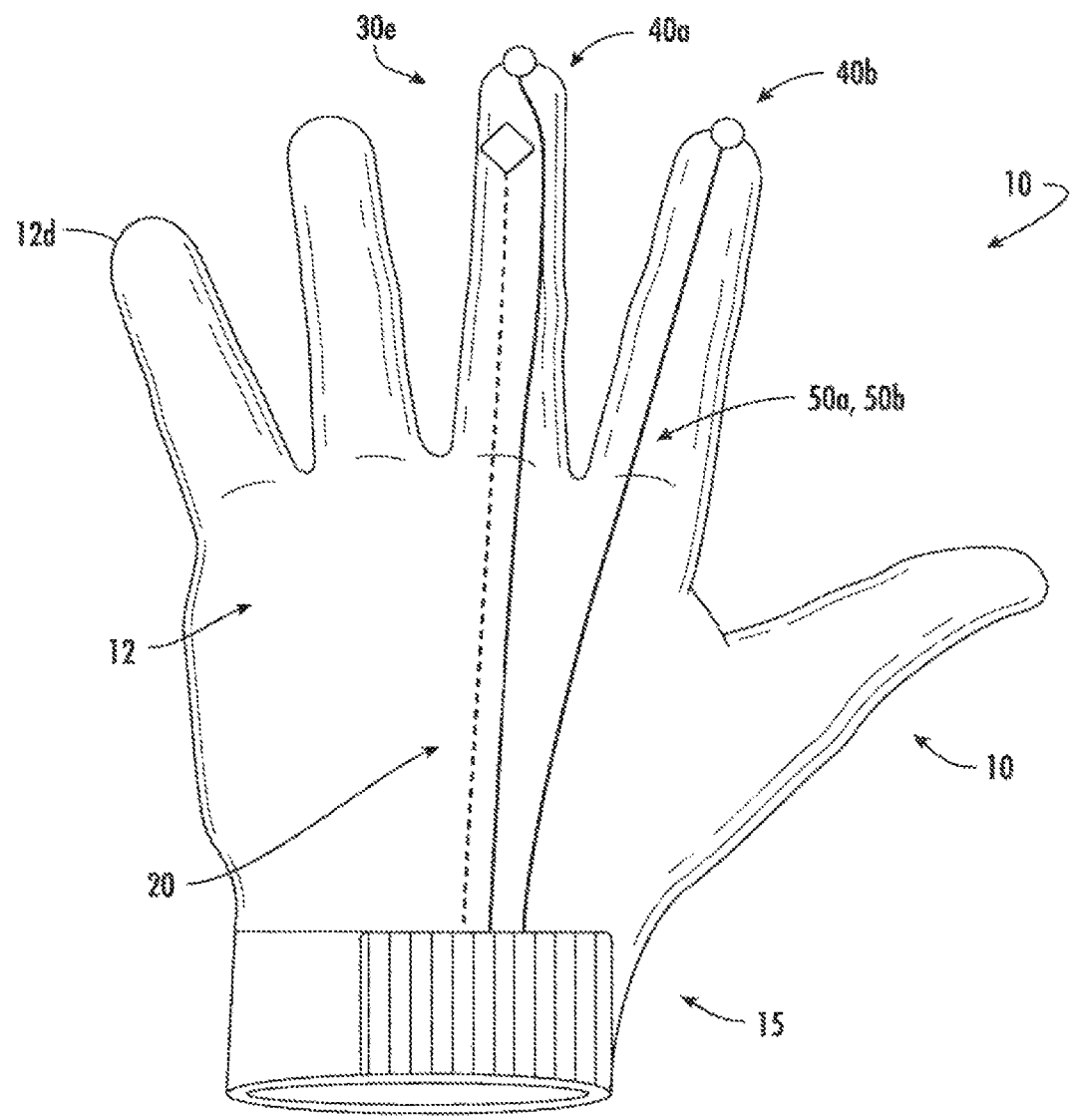

Another embodiment of hand-wearable device 10 includes an electrical discharge that exits through contact terminals 40a and 40b positioned on fingertips 12d of the glove 12. In particular, FIGS. 3A and 3B show hand-wearable device 10 is activated via one or more pressure-sensitive switches 30e positioned on one or more fingertips 12d of glove 12. Stun hardware 15 is connected to contact terminals 40a and 40b by wires 50a and 50b and is activated when the one or more pressure sensitive switches 30e located in one or more fingertips 12d of glove 12 sense a predetermined threshold pressure.

Fingertip switches 30e may be located beneath an insulated shell (not shown) and thus inside the one or more fingertips 12d. The stun function may be activated by pressing two armed fingertips 12d into a target. Alternatively, glove 12 may be activated by pressing two armed fingertips 12d together. A strip of conductive material (not shown) may be located on the palm of the glove to protect the user from accidental discharge. This conductive palm patch exists in this embodiment because the pressure sensor and discharge terminals are located on the fingertips, which has the potential to endanger a user when making a fist.

Figure 3C:
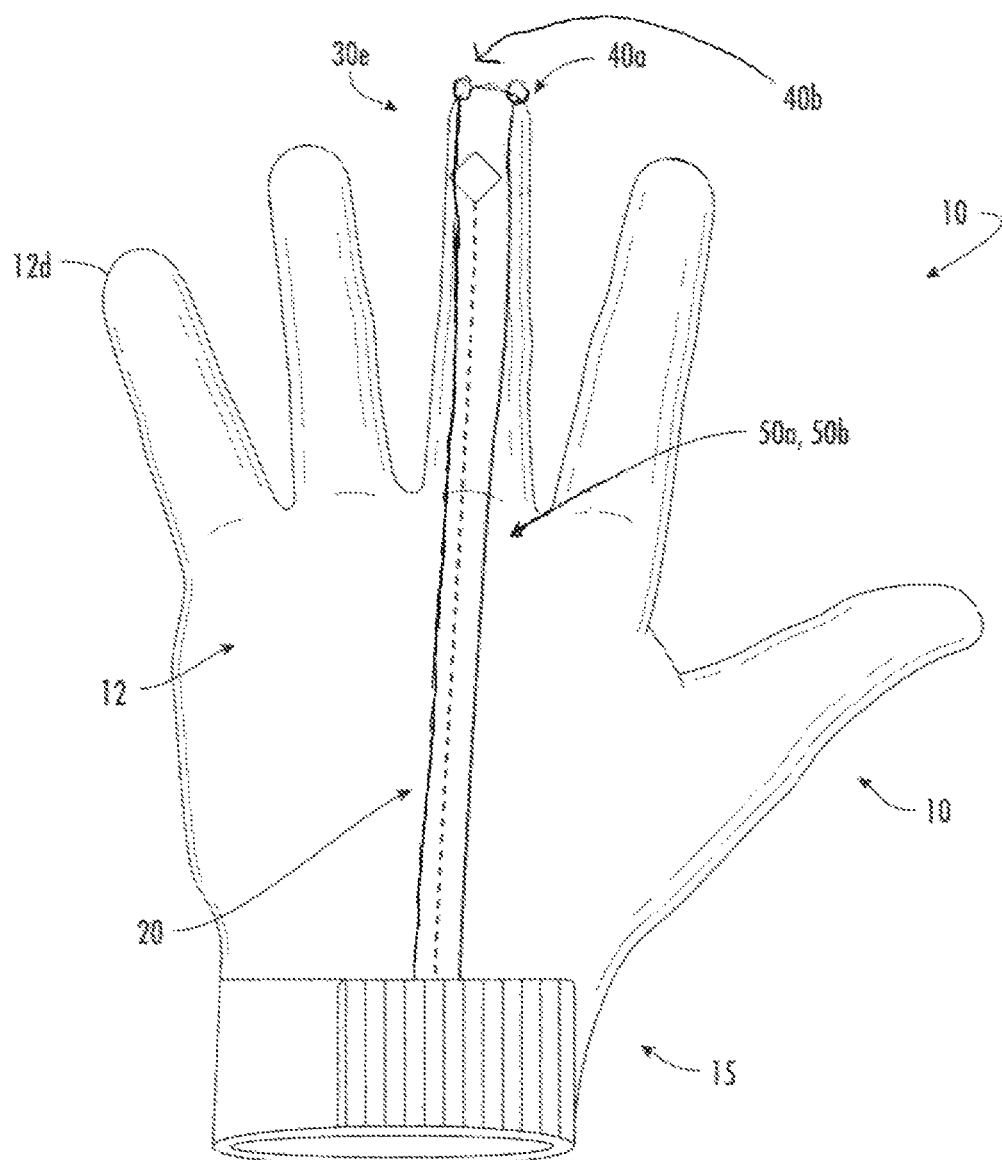
FIG. 3C shows a fourth embodiment of a hand-wearable device.

In a further embodiment, FIG. 3C shows hand-wearable device 10 in which an electrical discharge exits through contact terminals 40a and 40b both positioned on a single finger of glove 12. In particular, FIG. 3C shows hand-wearable device 10 is activated via one or more pressure-sensitive switches 30e positioned on one fingertip 12d of glove 12. Stun hardware 15 is connected to contact terminals 40a and 40b by wires 50a and 50b and is activated when the pressure sensitive switch 30e located in fingertip 12d of glove 12 senses a predetermined threshold pressure. Pressure sensitive switch 30e is connected to stun hardware 15 by switch wire 20.

In the embodiment represented by FIG. 3C, in which the contact terminals are both positioned on a single finger of glove 12, the contact terminals may be present on any one or more of the fingers of glove 12. Further, the contact terminals may be positioned on the front and/or back side of a finger, and configured such that discharge may result from impact with the front and/or back of the glove, and/or from grasping with the glove.

Further, glove 12 may comprise an accelerometer (not shown) that activates the glove according to various settings. In particular, the device may include an accelerometer adapted to prevent the discharge of an electrical charge from any one of terminals 40a-40b when the acceleration of glove portion 12 has not reached a predetermined acceleration rate.

In operation, when the user is wearing the glove and the on/off switch is set for normal usage, the device activates as follows. In the act of pushing an attacker away, the user's hand must first cross the safety threshold of the onboard accelerometer. Upon connecting with the target, the switch/trigger will be compressed by the impact and activate the onboard capacitor/transformer (already charged by the rechargeable battery). The discharge will exit the electric terminals located on the fingertips. A similar, more focused, result may be achieved with a finger stab. With the activation, these terminals will make a contact point with the target as with a traditional stun gun.

A secondary method of activation bypasses the onboard accelerometer, to allow activation in a grapple situation. The pressure-sensitive switch, once a lower pressure threshold has been exceeded, will override/bypass the accelerometer safety and activate the onboard capacitor/transformer. As with a traditional stun gun, the device will continue to discharge until the switch/trigger is released. In the case where the device registers an acceleration above an upper threshold, a secondary firing mode will engage. This may be achieved by either complete discharge of the capacitor or a secondary discharge simultaneously coming from a secondary capacitor. This mode exists because a presumed strike would be of sufficient speed/force where the user's hand would not likely be in contact with the target for a long period of time, making it necessary and safer to dump a larger amperage into the target to deliver a stunning shock. This leverages the immediate timing facilitated by having the activating/firing switch located below/beneath one of the fingertip electrical terminals. In the bypass mode, the safety of the lower accelerometer threshold is overridden. This mode may also remove the lower safety threshold of the pressure switch. In this mode, any activation of the switch/trigger will activate the onboard capacitor/transformer. The previously described secondary firing mode works the same way as the normal "on" mode.

Figure 4A:
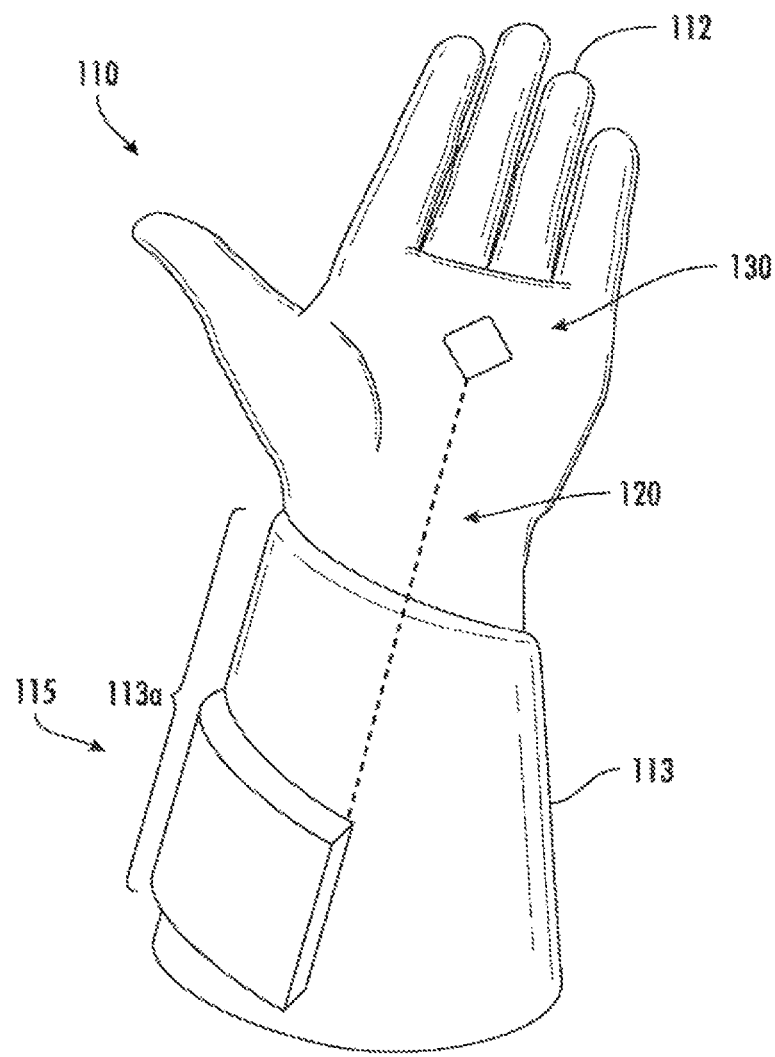
FIG. 4a shows a fifth embodiment of a hand-wearable device utilizing a hands-free taser device.
Figure 4B:
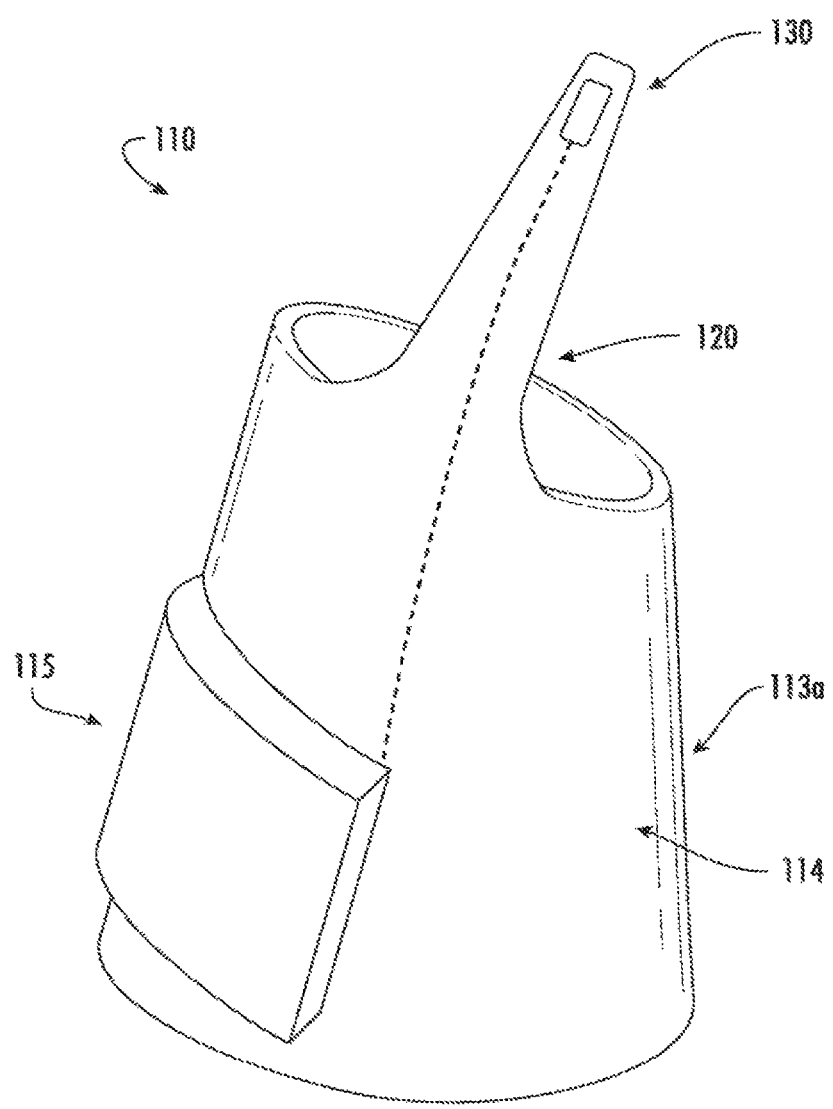
FIG. 4b shows the fifth embodiment of a hand-wearable device housed within a bracer.

In another embodiment, a hands-free taser device 110 capable of electro muscular incapacitation is shown in FIGS. 4A and 4B. In particular, hands-free taser device 110 is mounted to a rigid or semi-rigid cuff, gauntlet, bracer, and/or glove 112. The semi-rigid version may be best suited for concealed usage, whereas the rigid design may be more suitable for open military or combat use.

Figure 6:
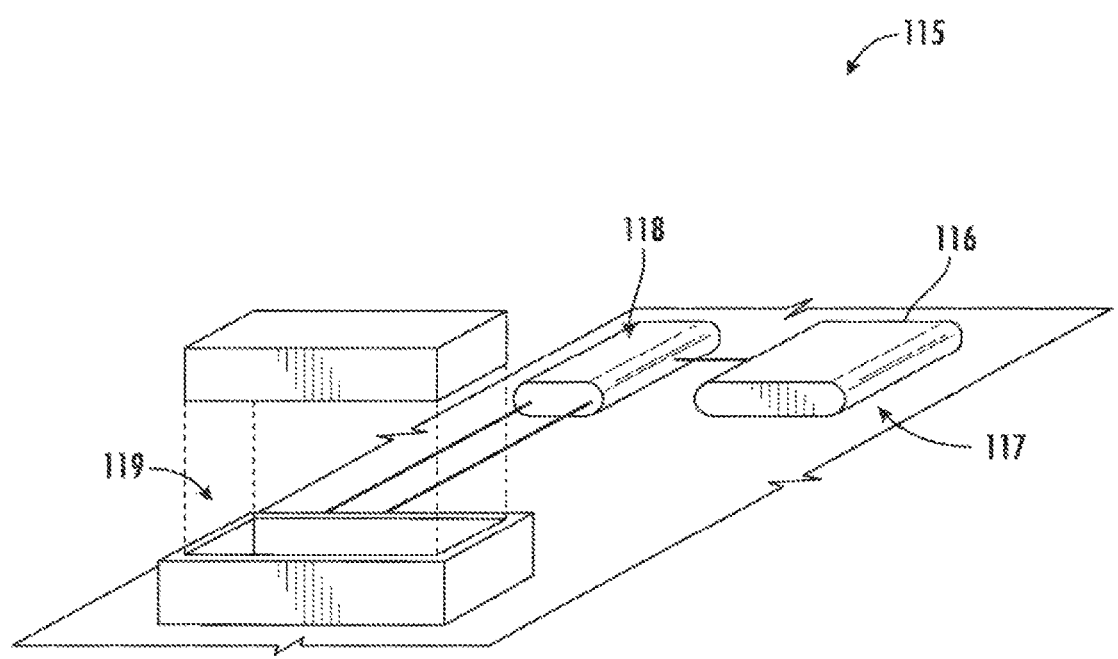
FIG. 6 illustrates elements of a taser hardware component used with a hands-free taser device.

FIG. 4A shows a palm-side view of glove 112 and cuff 113. Glove 112 and a cuff 113, together comprise a gauntlet having a back side 112a and a palm side 112b, a taser hardware component 115 (shown in FIG. 6) including a charging port (not shown), a rechargeable battery 117, a capacitor 118, and a probe/electrode cartridge 119.

Taser hardware 115 may be positioned on a user's wrist, specifically on cuff 113. A switch 130 for activating the taser may be located on the user's palm as shown in FIG. 4A. FIG. 4B shows a hands-free taser device utilizing a bracer 114. When a cuff 113, glove 112, or bracer 114 is utilized, switch 130 may be positioned on the user's inside forearm and incorporated within an elongated, flexible portion thereof. The elongated portion of the bracer 114, gauntlet 112, or cuff 113 may also include Velcro or an elastic band (not shown) to maintain the position of switch 130 flush with the user's arm. Locating taser device 115 and switch 130 on the inside of the user's forearm, acts to prevent accidental discharge.

Hands-free taser device 110 may be hidden under a user's sleeve, and therefore does not need to be holstered or drawn. Since switch 130 may be concealed in the user's palm, or within the palm of glove 112, the user need only direct his or her arm in the direction of a target and activate switch 130. In addition, the location of switch 130 is characterized by a hand/wrist position that keeps the user's hand and fingers clear of the trajectory of the taser electrodes.

The hand-wearable hands-free taser device 110 may be a stand-alone device or may be mounted to an electrical stun device such as that described with respect to Embodiments 1-3.

I claim:

1. A hand-wearable device for electro-muscular incapacitation, said hand-wearable device comprising:
   a glove portion including a back side and a palm side;
   a stun hardware component including a charging port, a rechargeable battery, and a capacitor;
   first and second terminals positioned on a first finger of the glove portion and electrically connected to the stun hardware component;
   a switch for actuating the discharge of an electrical charge from the first and second terminals when impact is made with the switch; and
   an accelerometer adapted to prevent the discharge of an electrical charge from the first and second terminals when the acceleration has not reached a predetermined rate.

2. The hand-wearable device of claim 1, further comprising:
   third and fourth terminals positioned on a second finger of the glove portion and electrically connected to the stun hardware component, and
   a second switch for actuating the discharge of an electrical charge from the third and fourth terminals when impact is made with the second switch.

3. The hand-wearable device of claim 2, wherein said accelerometer is adapted to prevent discharge of an electrical charge from the third and fourth terminals when the acceleration has not reached the predetermined rate.

4. The hand wearable device of claim 1 further including a second capacitor that is activated when the acceleration of the accelerometer is equal to or above a second predetermined rate.

5. The hand wearable device of claim 1 wherein a greater amperage is discharged when the acceleration of the accelerometer is equal to or above a second predetermined rate.

6. The hand-wearable device of claim 1 wherein the device includes an "off" setting.

7. The hand-wearable device of claim 1 wherein the device includes an override setting wherein the accelerometer is deactivated and the switch may be actuated regardless of the rate of acceleration.

8. The hand-wearable device of claim 1 wherein the terminals and switch are located on a knuckle area of the first finger of the glove portion.

9. The hand-wearable device of claim 1 wherein the terminals and switch are located on a fingertip area of the first finger of the glove portion and the switch is a pressure sensitive switch.

10. The hand-wearable device of claim 1 wherein the glove portion is an insulated glove.

11. The hand-wearable device of claim 1 wherein the glove portion includes a hardened outer exterior.

12. The hand-wearable device of claim 1 wherein the palm side of the glove portion includes a strip of conductive material for preventing accidental discharge when a user makes a fist.

13. A hand-wearable device capable of electro-muscular incapacitation, said hand-wearable device comprising:
a glove portion including a back side and a palm side;
a stun hardware component including a charging port, a rechargeable battery, and a capacitor;
first and second terminals positioned on a first finger of the glove portion and electrically connected to the stun hardware component;
a switch for actuating the discharge of an electrical charge from the first and second terminals when impact is made with the switch;
third and fourth terminals positioned on a second finger of the glove portion and electrically connected to the stun hardware component, and a second switch for actuating the discharge of an electrical charge from the third and fourth terminals when impact is made with the second switch; and
an accelerometer adapted to prevent the discharge of an electrical charge from the first and second terminals when the acceleration has not reached a predetermined rate.

14. The hand-wearable device of claim 12, wherein the accelerometer is adapted to prevent the discharge of an electrical charge from the third and fourth terminals when the acceleration has not reached the predetermined rate.

15. The hand wearable device of claim 13 further including a second capacitor that is activated when the when the acceleration of the accelerometer is equal to or above a second predetermined rate.

16. The hand wearable device of claim 13 wherein a greater amperage is discharged when the acceleration of the accelerometer is equal to or above a second predetermined rate.

17. The hand-wearable device of claim 13 wherein the device includes an "off" setting.

18. The hand-wearable device of claim 13 wherein the device includes an override setting wherein the accelerometer is deactivated and the switches may be actuated regardless of the rate of acceleration.

19. The hand-wearable device of claim 13 wherein at least one of (a) the first and second terminals and switch, and (b) the third and fourth terminals and second switch, are located on a knuckle area of, respectively, the first finger and second finger of the glove portion.

20. The hand-wearable device of claim 13 wherein at least one of (a) the first and second terminals and switch, and (b) the third and fourth terminals and second switch, are located on a fingertip area of, respectively, the first finger and second finger of the glove portion, and at least one of the switches is a pressure sensitive switch.

21. The hand-wearable device of claim 20 wherein the palm side of the glove portion includes a strip of conductive material for preventing accidental discharge when a user makes a fist.

* * * * *